United States Patent
Whitmer et al.

(10) Patent No.: US 7,444,678 B2
(45) Date of Patent: Oct. 28, 2008

(54) SECURING RESOURCES FROM UNTRUSTED SCRIPTS BEHIND FIREWALLS

(75) Inventors: Ray Whitmer, Pleasant Grove, UT (US); Harish Dhurvasula, San Jose, CA (US)

(73) Assignee: AOL LLC, Dulles, VA (US)

( * ) Notice: Subject to any disclaimer, the term of this patent is extended or adjusted under 35 U.S.C. 154(b) by 821 days.

(21) Appl. No.: 10/868,414

(22) Filed: Jun. 14, 2004

(65) Prior Publication Data

US 2005/0091536 A1   Apr. 28, 2005

Related U.S. Application Data

(60) Provisional application No. 60/515,483, filed on Oct. 28, 2003.

(51) Int. Cl.
*G06F 12/14* (2006.01)
(52) U.S. Cl. .............. 726/22; 726/23; 726/24; 726/25; 726/4; 713/165; 713/166; 713/167
(58) Field of Classification Search ............. 726/22–25, 726/4; 713/170, 152, 165–167
See application file for complete search history.

(56) References Cited

U.S. PATENT DOCUMENTS

| | | | |
|---|---|---|---|
| 5,968,176 A | 10/1999 | Nessett et al. | |
| 5,987,611 A | 11/1999 | Freund | |
| 6,052,788 A | 4/2000 | Wesinger, Jr. et al. | |
| 6,061,798 A | 5/2000 | Coley et al. | |
| 6,088,796 A | 7/2000 | Cianfrocca et al. | |
| 6,104,716 A | 8/2000 | Crichton et al. | |
| 6,192,476 B1 * | 2/2001 | Gong | 726/4 |
| 6,275,938 B1 * | 8/2001 | Bond et al. | 726/23 |
| 6,298,445 B1 | 10/2001 | Shostack et al. | |
| 6,304,967 B1 | 10/2001 | Braddy | |
| 6,324,648 B1 | 11/2001 | Grantges, Jr. | |
| 6,366,912 B1 | 4/2002 | Wallent et al. | |
| 6,367,012 B1 * | 4/2002 | Atkinson et al. | 713/176 |
| 6,499,107 B1 | 12/2002 | Gleichauf et al. | |
| 6,510,464 B1 | 1/2003 | Grantges, Jr. et al. | |
| 6,832,239 B1 * | 12/2004 | Kraft et al. | 709/203 |
| 2001/0044894 A1 * | 11/2001 | Saito et al. | 713/156 |

* cited by examiner

*Primary Examiner*—Thanhnga B Truong
(74) *Attorney, Agent, or Firm*—Michael A. Glenn; Glenn Patent Group

(57) ABSTRACT

The invention provides a new mechanism which is used to protect all internal resources against requests from sandboxed scripts. In the preferred embodiment, the mechanism is implemented for SOAP calls by untrusted scripts. When an attempt is made to access a resource at a previously-unknown URI, the sandbox reads a file at that domain with declarations to determine whether access is permitted to the script. If the file is not found, the access is denied.

15 Claims, 5 Drawing Sheets

SECURING RESOURCES FROM UNTRUSTED SCRIPTS BEHIND FIREWALLS

CROSS REFERENCE TO RELATED APPLICATIONS

This application claims priority to prior U.S. Provisional Application Number 60/515,483, filed Oct. 28, 2003, entitled Securing Resources From Untrusted Scripts Behind Firewalls, which is incorporated herein in its entirety by this reference thereto.

BACKGROUND OF THE INVENTION

1. Technical Field

The present invention relates generally to network security, and more particularly to a method and system for securing resources from untrusted scripts behind firewalls.

2. Description of the Prior Art

Presently, many computer users primarily employ Internet browsing applications (the browser) for accessing the World Wide Web (WWW, or the Web). The World Wide Web comprises all Web servers on the Internet serving static or dynamically generated Hypertext Markup Language (HTML) documents over the standard Internet protocols like Hypertext Transfer Protocol (HTTP). To access the Web, a user just points his browser to a Uniform Resource Locator (URL), which identifies resources via a representation of their primary access mechanism (e.g. their network location) rather than identifying the resource by name or by some other attributes of that resource. The URL is a subset of Uniform Resource Identifier. The Uniform Resource Identifier (URI) is a compact string of characters for identifying an abstract or physical resource, which has a well-defined syntax.

Scripts in various languages have been introduced to make Web pages more interactive by manipulating HTML elements. JavaScript language is probably the most common used script language on the Web. An HTML document may embed Scripts directly or include URL references to script documents. Either way, the scripts are downloaded along with the HTML document.

Nowadays, many powerful functions have been added script languages, and the scripts can be coded to access resources from a different domain. The scripts can even issue calls over the Simple Object Access Protocol (SOAP).

SOAP is a way for a program running in one kind of operating system (such as Windows 2000) to communicate with a program in the same or another kind of an operating system (such as Linux) by using the World Wide Web's Hypertext Transfer Protocol (HTTP) and its Extensible Markup Language (XML) as the mechanisms for information exchange. Since Web protocols are installed and available for use by all major operating system platforms, HTTP and XML provide an already at-hand solution to the problem of how the programs running under different operating systems in a network can communicate with each other. SOAP specifies exactly how to encode an HTTP header and an XML file so that a program in one computer can call a program in another computer and pass it information. It also specifies how the called program can return a response.

An advantage of SOAP is that program calls are much more likely to get through firewall servers that screen out requests other than those for known applications (through the designated port mechanism). Because HTTP requests are usually allowed through firewalls, programs using SOAP are most likely able to communicate with programs behind the firewall.

To protect internal resources behind a firewall, external untrusted scripts loaded are typically executed in a security sandbox. A security sandbox is a protected, limited environment where applications, such as scripts downloaded from the Internet, are allowed to run without risking damage to the rest of the system.

The external untrusted scripts may legitimately require access to external resources. However, permitting the scripts to access internal resources would permit the compromise of the internal resources that are usually not available to applications outside of the firewall. The security sandbox must distinguish and protect internal resources.

Several client-controlled solutions have been designed to prevent sandboxed applications loaded behind a firewall from compromising other internal resources protected behind the firewall. Sample solutions include "same source restriction", "white-listing", "signed scripts" and "asking the user".

In the "same source restriction" approach, sandboxed scripts are restricted to access only resources in the domain from which they were loaded, and any script loaded from one domain into another is prevented from accessing resources in the domain into which it has been loaded. This policy has generally been successful in sandboxing JavaScript and Java applets across the Web. However, if the sandbox is unable to distinguish the common URI substring of the domain to be trusted from similar URIs of untrusted domains, then it could allow a script loaded from an indistinguishable domain to exploit firewall-protected resources. Furthermore, this technique prevents the script from accessing many legitimate external resources not provided in the same domain as the script because it prevents a script from accessing Web services and data published from any domain besides its own.

In the "white-listing" approach, a white list of trusted URIs is created from which scripts are trusted to not compromise internal resources. In addition, it is possible to release domains from the stricter same source restriction approach. A white list is a good tool for including always-trusted domains. However, on the Web, it is often a script from a relatively-untrusted domain that must be granted access to other untrusted domains, without compromising internal domains. More-complex access lists could be created to try to establish, with finer granularity, which domains are to be accessible or permitted from which other domains, but this requires extensive management which at best is quite error-prone for the end user and easily opens holes in a firewall that do not directly hurt the user who reconfigured his browser to try to access some external service but hurts the owners of other services behind the firewall.

In the "signed scripts" approach, a certain degree of additional trust may be lent to a script by having the author digitally sign it. But signed scripts approach has not really caught on as it requires certificates and it does not change the basic problem that some completely-unknown party has written a script that might now have access to internal resources.

In the "asking the user" approach, when the sandbox cannot otherwise determine whether the executing script should be permitted access to the resource, a dialog box may be raised to ask the user to grant special privileges. This is currently permitted for locally-saved scripts and signed scripts. This could be combined with the other options above such as white-listing, signed scripts, etc. But the big problem with this is that the typical browser user really does not either understand or pay the consequences if he inadvertently opens a hole in his company's firewall. Quite complex settings may be required to permit the user to allow access to desired external services without risking other resources.

Therefore, access by untrusted scripts really needs to be under the control of the stake holder, which is the resource and server owner—not the user—to determine whether a resource should be insulated from Web applications loaded from outside of the firewall. One approach is to use SOAP header for verification in SOAP protocol, as offered in the current Mozilla implementation of SOAP. SOAP messages have a distinct processing model allowing a header to be added that the recipient is required to understand and accept, which identifies the untrusted source of a script making a request. SOAP services which have not been cleared for access by untrusted scripts will reject the requests.

Unfortunately, this does not prevent SOAP messages from being sent to non-SOAP addresses, which is a critical issue that the verification cannot stand alone to guarantee that untrusted service requests are always properly rejected by services that should be firewall-protected. It may also be inconvenient to modify a SOAP service to ignore the specific verification header.

It is therefore desired to develop a new technique for securing resources from untrusted scripts behind a network firewall. The technique should allow the resource and server owner to determine whether a resource should be insulated from Web applications loaded from outside of the firewall. The technique should be robust, easy to configure. Particularly, the technique should be applicable to untrusted scripts which are capable of making SOAP calls, and it should also provide configuration of access to the resource based on a request type.

SUMMARY OF THE INVENTION

The invention provides a new mechanism which is used to protect all internal resources against requests from sandboxed scripts. In the preferred embodiment, the mechanism is implemented for SOAP calls by untrusted scripts. When an attempt is made to access a resource at a previously-unknown URI, the sandbox reads a file at that domain with declarations to determine whether access is permitted to the script. If the file is not there, access is denied.

In one preferred embodiment of the invention, a method for protecting internal resources against an untrusted script originated from an external server is disclosed. The script is executed in a security sandbox behind a network firewall. The method includes the following steps:
  The untrusted script requests to access an internal resource at an internal server;
  The security sandbox loads a plurality of script control definitions, the plurality of script control definitions comprising allowable request types and script originations;
  The security sand box validates the plurality of script control definitions;
  The security sandbox verifying that the type of request is allowed in the plurality of script control definitions;
  The security sandbox verifying the origination of the untrusted script is allowed in the plurality of script control definitions; and
  The security sandbox allows the untrusted script to access the internal resource.

In another preferred embodiment of the invention, a method for protecting internal resources against an untrusted script originated from an external server. The script is executed in a security sandbox behind a network firewall. The method includes the following steps:
  The untrusted script requests to access an internal resource at a request URI;
  The security sandbox loads a script control definition from a declaration file at the root directory of the request URI, the script control definition including allowable request types and script originations; and
  The security sand box validates the script control definition at the root directory;
  When the request URI is not a subdirectory, the method further includes the following steps:
  The security sandbox verifying the type of request is allowed in the script control definition at the root directory;
  The security sandbox verifying the origination of the untrusted script is allowed in the script control definition at the root directory; and
  The security sandbox allows the untrusted script to access the internal resource.

In another preferred embodiment of the invention, a system for protecting internal resources against untrusted scripts is disclosed. The system includes the following:
  An untrusted script originated from an external server;
  A security sandbox wherein the untrusted script are executed behind a network firewall; and
  An internal server serving internal resources, the internal server further comprising a plurality of script control definitions defined in a plurality of declaration files.

In the system, the untrusted script requests to access an internal resource at the internal server via a request URI; the security sandbox loads a script control definition from a declaration file at the root directory of the request URI, the script control definition including allowable request types and script originations; and the security sand box validates the script control definition at the root directory.

DETAILED DESCRIPTION OF THE INVENTION

The invention provides a new mechanism which is used to protect all internal resources against requests from sandboxed scripts. In the preferred embodiment, the mechanism is implemented for SOAP calls by untrusted scripts. When an attempt is made to access a resource at a previously-unknown URI, the sandbox reads a file at that domain with declarations to determine whether access is permitted to the scripts. If the file is not there, access is denied.

Figure 1:
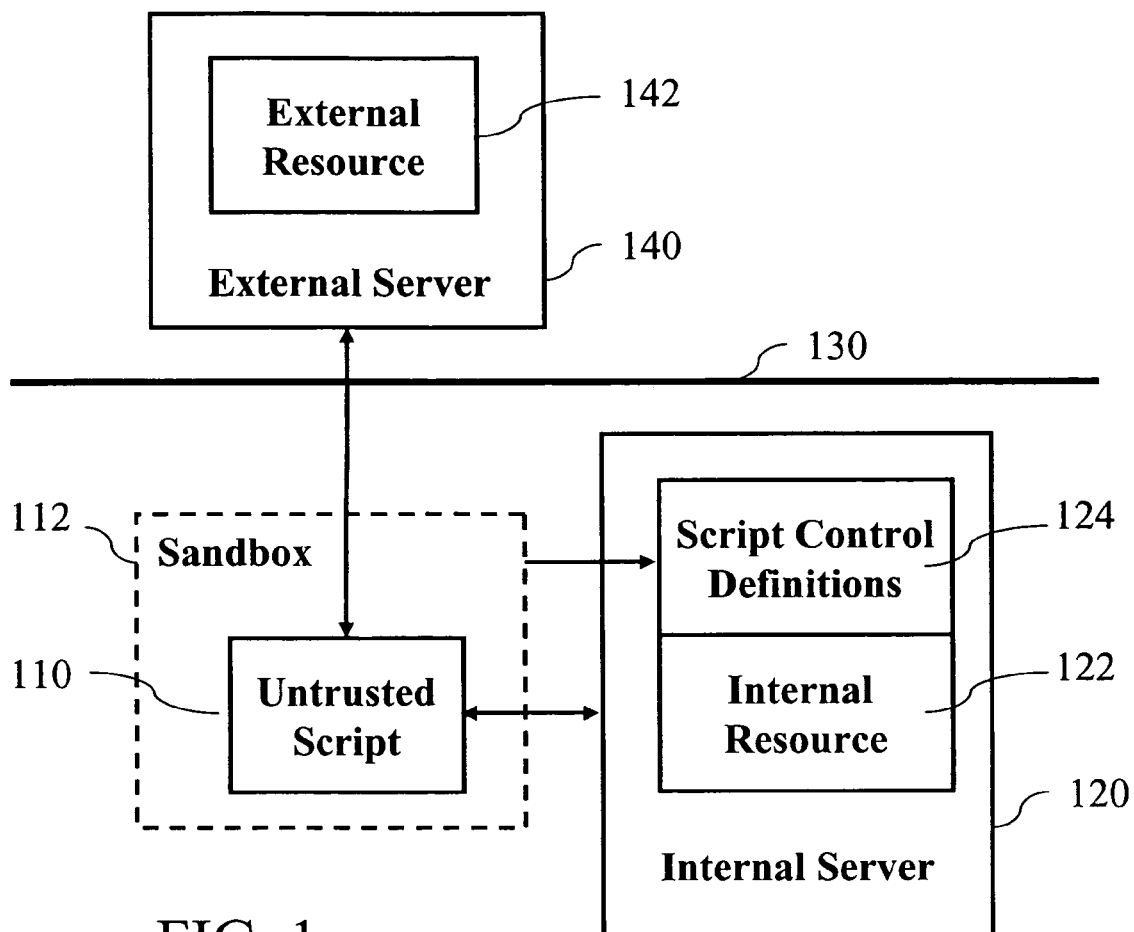
FIG. 1 shows a simplified diagrammatic view of the system for securing resources from untrusted scripts behind network firewalls according to one preferred embodiment of the invention.

Turning now to the drawings, FIG. 1 shows a simplified diagrammatic view of the system for securing resources from untrusted scripts behind network firewalls according to one preferred embodiment of the invention. The system includes an untrusted script 110 originated from an external server 140, a security sandbox 112 wherein the untrusted script 110 are executed behind a network firewall 130, and an internal server 120.

The internal server 120 includes the internal resources 122 and a plurality of script control definitions 124 defined in a plurality of declaration files. The external server 140 includes external resources 142.

The declaration files are preferably written in XML and have the following syntax:

<!ELEMENT WebScriptAccess (delegate?|allow*)>
<!ELEMENT delegate EMPTY>
<!ELEMENT allow EMPTY>
<!ATTLIST allow type|from CDATA #IMPLIED>

A declaration file typically has a root element, a delegate element and a plurality of allow elements.

As an example, the root element of the declaration file should be the following:

<wsa:WebScriptAccess
xmlns:wsa="http://www.mozilla.org/2002/soap/security">

Figure 5:
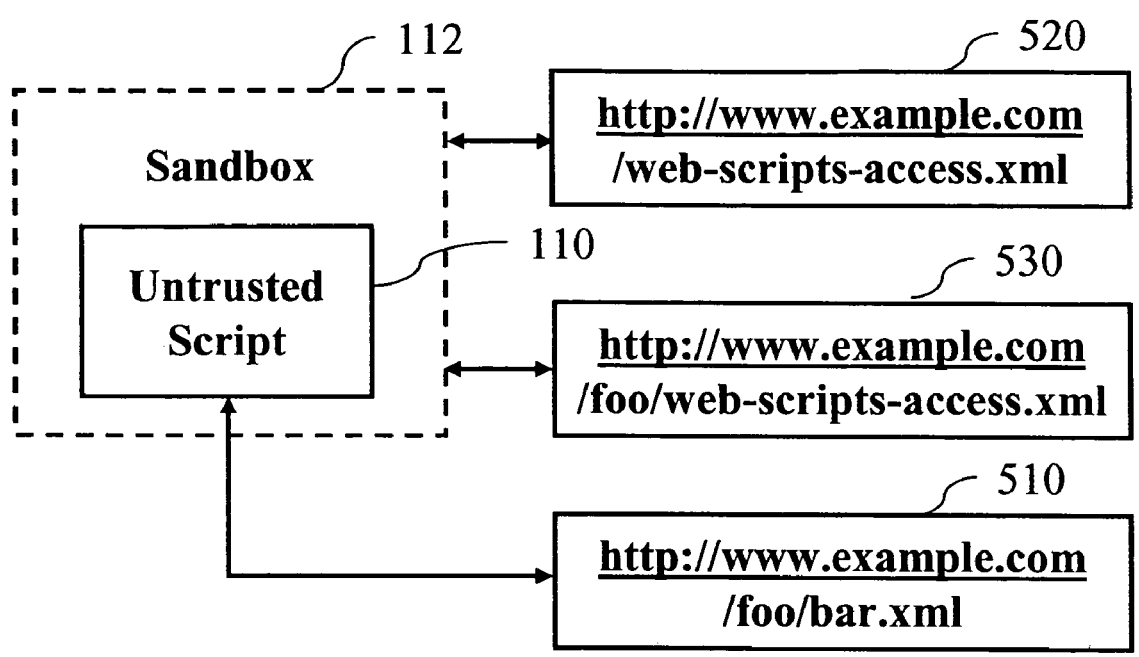
FIG. 5 is a schematic view of an example of script control delegation according to one embodiment of the invention.

The delegation element is used to delegate the script control to the subdirectory of a request URI. If the <delegate/>element is present then "Web-scripts-access.xml" is required in the subdirectory for URIs which are in a subdirectory. FIG. 5 depicts a schematic view of an example of script control delegation according to one embodiment of the invention. In FIG. 5, the untrusted script 110 executed within the sandbox is accessing an internal resource at the URI 510:

http://www.example.com/foo/bar.xml

The security sandbox 112 first loads the declarations file at the root directory of request URI 510, which is URI 520:

http://www.example.com/Web-scripts-access.xml

In the example, the "delegate" element is found in the declarations file at the root directory, and hence the security control delegates to the subdirectory of the request URI 510, which is at URI 530:

http://www.example.com/foo/Web-scripts-access.xml

If the URI is in a subdirectory, and if the root directory's access file delegates while no access file exists in the subdirectory, then no access is granted. If the root's access file did not delegate, then that access file also handles all resources in subdirectories.

The allow element defines a script access control entry to permit scripts to access the resources of this server. The allow element comprises a "type" attribute and a "from" attribute. The syntax of the allow element is as following:

<wsa:allow type="<request-type>" from="<uri-prefix>"/>

The type attribute, if specified, is checked against the type of request being requested by the script, such as "soap", "soapv", or "load". Types must not contain spaces. Specify "any" as the type to permit any requested type of access to resources.

The principle URI of the script is checked for the specified URI prefix. If the "from" attribute is not specified, then all scripts are allowed. One can also use wild charater(s) in "from" value.

For example:

<wsa:allow type="soapv" from="http://www.mozilla.org"/>

This script access control entry allows SOAP requests with verification headers from scripts loaded from the domain www.mozilla.org.<wsa:allow type="soapv" from="http://*.mozilla.org"/>

This script access control entry allows SOAP requests with verification headers from scripts loaded from the domain with host name containing mozilla.org. That is, http://www.mozilla.org/, http://lxr.mozilla.org, http://komodo.mozilla.org, etc. will be granted access.

Any syntax error in the document results in the rest of the file to be ignored. Since the commands only allow access, the order of processing the "allow" commands that were successfully parsed is never significant.

Figure 2:
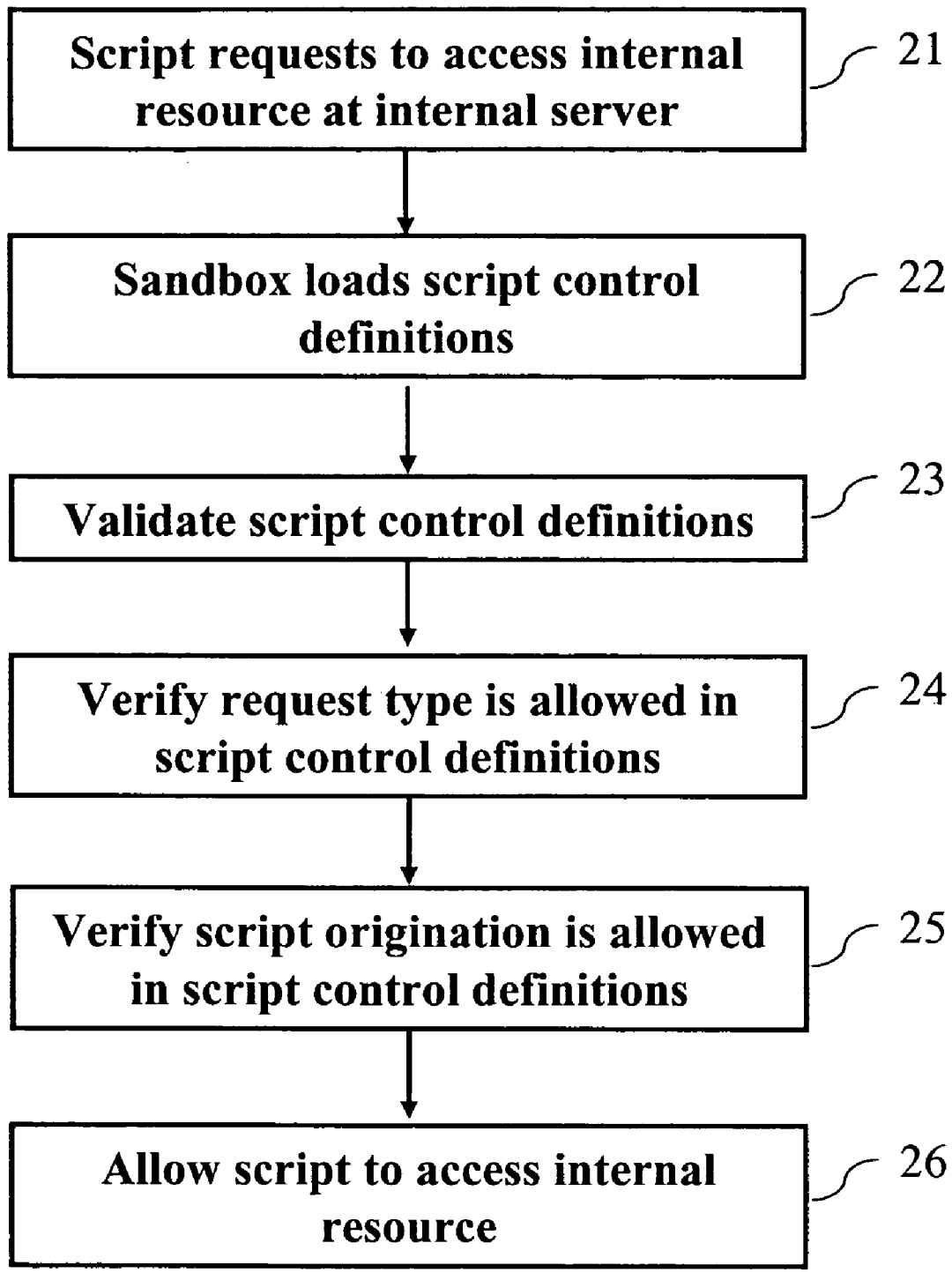
FIG. 2 is a schematic flowchart diagram depicting a method for protecting internal resources against an untrusted script originated from an external server according to one preferred embodiment of the invention.

FIG. 2 is a schematic flowchart diagram depicting a method for protecting internal resources against an untrusted script originated from an external server according to one preferred embodiment of the invention. In this embodiment, the script is executed in a security sandbox behind a network firewall. The method includes the steps of:

Step 21: The untrusted script requests to access an internal resource at an internal server.

Step 22: The security sandbox loads a plurality of script control definitions. The plurality of script control definitions includes allowable request types and script originations.

The security sandbox must deny the untrusted script to accept the internal resource if the script control definitions are not found.

Step 23: The security sand box validates the plurality of script control definitions.

The security sandbox must deny the untrusted script to accept the internal resource if the security box cannot validate the plurality of script control definitions.

Step 24: The security sandbox verifies the type of request is allowed in the plurality of script control definitions.

The security sandbox must deny the untrusted script to accept the internal resource if the type of request is not allowed in the plurality of script control definitions.

Step 25: The security sandbox verifies the origination of the untrusted script is allowed in the plurality of script control definitions.

The security sandbox must deny the untrusted script to accept the internal resource if the origination of request is not allowed in the plurality of script control definitions.

Step 26: The security sandbox allows the untrusted script to access the internal resource.

Figure 3:
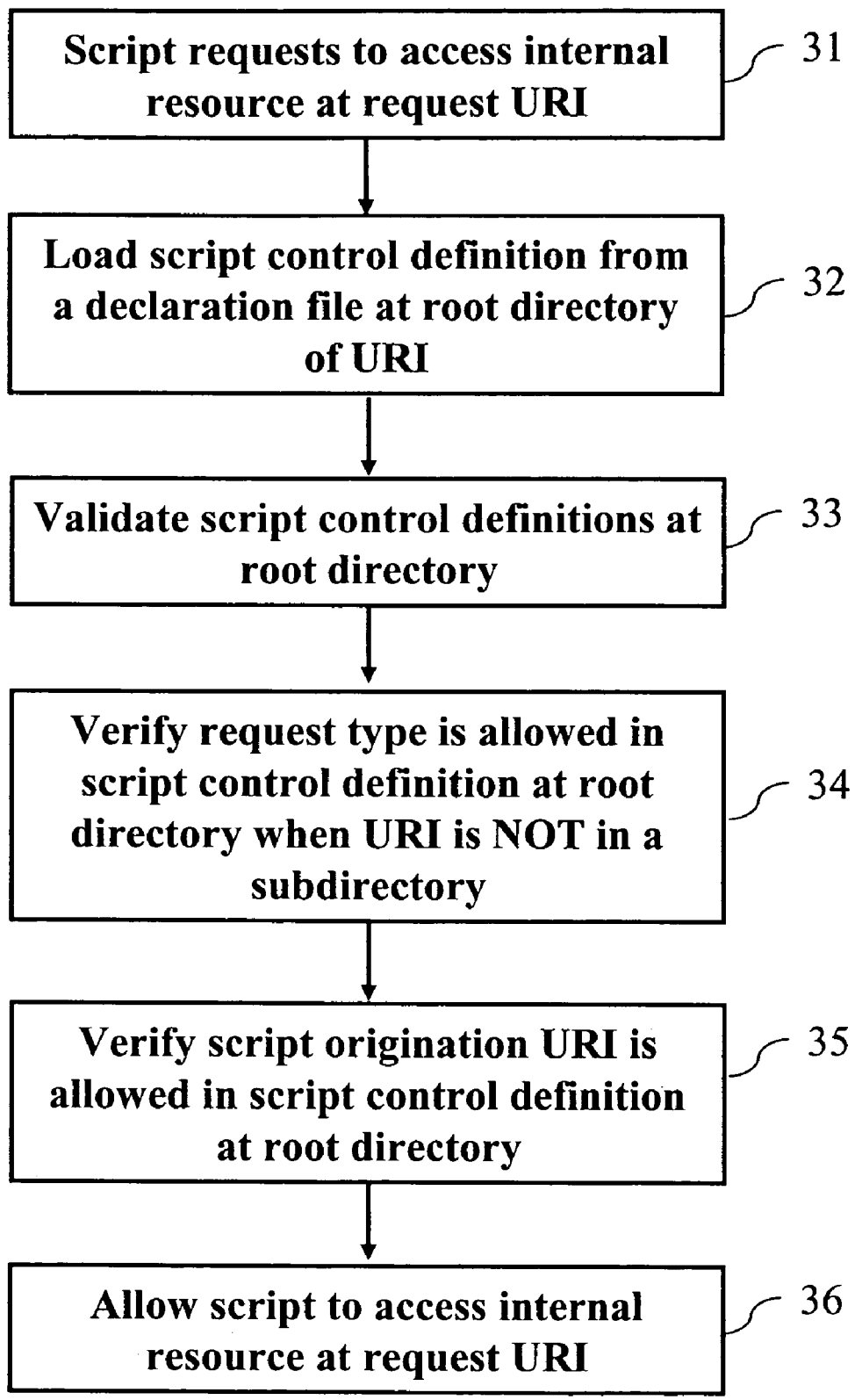
FIG. 3 is a schematic flowchart diagram depicting a method for protecting internal resources against an untrusted script originated from an external server according to another preferred embodiment of the invention.

FIG. 3 is a schematic flowchart diagram depicting a method for protecting internal resources against an untrusted script originated from an external server according to another preferred embodiment of the invention. In this embodiment, the untrusted script is executed in a security sandbox behind a network firewall. The method includes the steps of:

Step 31: The untrusted script requests to access an internal resource at a request URI.

Step 32: The security sandbox loads a script control definition from a declaration file at the root directory of the request URI. The script control definition preferably includes allowable request types and script originations. The declaration file is preferably written in XML, the detail structure of which has been described above.

The security sandbox must deny the untrusted script to accept the internal resource if the declaration file is not found at the root directory.

Step 33: The security sand box validates the script control definition at the root directory.

The security sandbox must deny the untrusted script to accept the internal resource if the security box cannot validate the script control definition at the root directory.

This includes the following cases:

The declaration file is a not well-formed XML file; or

The declaration XML file is well-formed but not confirming to detail structure as discussed above.

When the request URI is not a subdirectory, the method further includes the steps of:

Step 34: The security sandbox verifies the type of request is allowed in the script control definition at the root directory.

The security sandbox must deny the untrusted script to accept the internal resource if the type of request is not allowed in the script control definition at the root directory.

Step 35: The security sandbox verifies the origination of the untrusted script is allowed in the script control definition at the root directory.

The security sandbox must deny the untrusted script to accept the internal resource if the origination of request is not allowed in the script control definition at the root directory.

Step 36: The security sandbox allows the untrusted script to access the internal resource.

Figure 4:
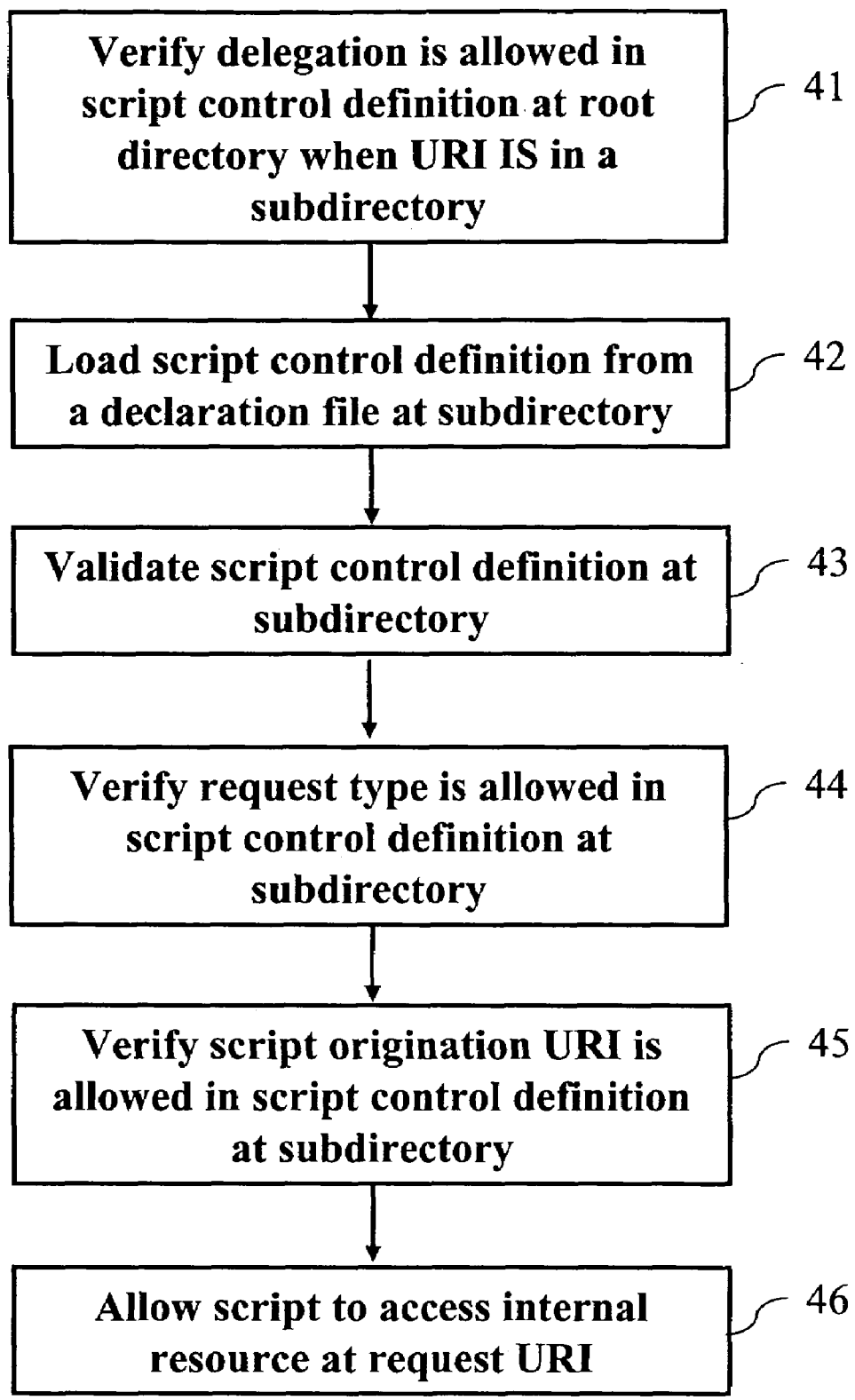
FIG. 4 is a schematic flowchart diagram depicting the method of FIG. 3 for securing untrusted scripts when the untrusted scripts is accessing a request URI in a subdirectory.

FIG. 4 is a schematic flowchart diagram further depicting the method of FIG. 3 for securing untrusted script when the untrusted script is accessing a request URI in a subdirectory. When the request URI is in a subdirectory, the method further includes the steps of:

Step 41: The security sandbox verifies delegation is allowed in the script control definition at root directory. This can be done by checking the existence of the delegate element in the script control definition at root directory.

Step 42: The security sandbox loads a script control definition from a declaration file at the subdirectory of the request URI. The script control definition preferably comprises allowable request types and script originations. The declaration file is preferably written in XML, the detail structure of which has been described above.

The security sandbox must deny the untrusted script to accept the internal resource if the declaration file is not found at the subdirectory.

Step 43: The security sand box validates the script control definition at the subdirectory.

The security sandbox must deny the untrusted script to accept the internal resource if the security box cannot validate the script control definition at the subdirectory.

Step 44: The security sandbox verifies the type of request is allowed in the script control definition at the subdirectory.

The security sandbox must deny the untrusted script to accept the internal resource if the type of request is not allowed in the script control definition at the subdirectory.

Step 45: The security sandbox verifies the origination of the untrusted script is allowed in the script control definition at the subdirectory.

The security sandbox must deny the untrusted script to accept the internal resource if the origination of request is not allowed in the script control definition at the subdirectory.

Step 46: The security sandbox allowing the untrusted script to access the internal resource.

The security sandbox typically maintains access information, for servers, in an access-info-cache (hashtable). If an entry was not found in the cache, then the system creates one by loading the declaration file (Web-scripts-access.xml) and extracting information from the declaration file. The type of request and the URI of the untrusted scripts are compared to the allowed type and origination in order to determine access. An entry is created if and only if the declaration file is considered valid (validation based on the syntax described above); an invalid document results in access denial. Denies script access in the event of not well-formed XML, or validation error, or if the declaration file does not grant access. Errors are reported to the security sandbox. These errors include validation error, not well-formed XML, file not found, etc.

Independent owners of subdirectories cannot grant Web script access to these subdirectories without getting the owner of the root directory to post a delegating access file. Normally a server is either inside or outside of a firewall, so this is not a problem for independent owners. Where a server spans multiple owners, the alternative would be to scan all directories in the path looking for a Web scripts access file. This allows independent management in domains where the top level owner may not care about providing access to Web services.

As this new model is applied to SOAP, and potentially document load or xml-request, it may be desirable to eliminate the same source security bypass because it is not clear that this is always secure. Other security adjustments may be desired as well.

The technique of the invention places the server operator, not the client in control of access to his server by untrusted scripts. The technique is robust and easy to configure. The access hole is no bigger than the service in question. The access is disabled by default, and there is nothing the user needs to do to open access, and nothing that can go wrong to make a hole in his firewall. It seems fairly easy to drop an access file into the root directory of the Web server to allow access.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

The invention claimed is:

1. A method for protecting internal resources against an untrusted script originated from an external server, said script being executed in a security sandbox behind a network firewall, said method comprising the steps of:

responsive to said untrusted script requesting access to an internal resource at a request URI, said security sandbox loading a script control definition from a declaration file at the root directory of said request URI, said script control definition comprising allowable request types and script originations;

said security sand box validating said script control definition at said root directory;

if said request URI is not a subdirectory, allowing said untrusted script to access said internal resource only in response to operations comprising:

said security sandbox verifying that the type of request is allowed in said script control definition at said root directory;

said security sandbox verifying that the origination of said untrusted script is allowed in said script control definition at said root directory;

if said request URI is a subdirectory, allowing said untrusted script to access said internal resource only in response to operations comprising:

said security sandbox verifying that delegation is allowed in said script control definition at root directory;

only if delegation is allowed, said security sandbox loading a script control definition from a declaration file at said subdirectory of said request URI, said script control definition at said subdirectory comprising allowable request types and script originations;

said security sand box validating said script control definition at said subdirectory;

said security sandbox verifying that the type of request is allowed in said script control definition at said subdirectory:

said security sandbox verifying that the origination of said untrusted script is allowed in said script control definition at said subdirectory.

2. The method of claim 1, further comprising the step of:
said security sandbox denying said untrusted script to accept said internal resource when said declaration file is not found at said root directory.

3. The method of claim 1, further comprising the step of:
said security sandbox denying said untrusted script to accept said internal resource when said security box cannot validate said script control definition at said root directory.

4. The method of claim 1, further comprising the step of:
said security sandbox denying said untrusted script to accept said internal resource when said type of request is not allowed in said script control definition at said root directory.

5. The method of claim 1, further comprising the step of:
said security sandbox denying said untrusted script to accept said internal resource when said origination of request is not allowed in said script control definition at said root directory.

6. The method of claim 1, further comprising the step of:
said security sandbox denying said untrusted script to accept said internal resource when said declaration file is not found at said subdirectory.

7. The method of claim 1, further comprising the step of:
said security sandbox denying said untrusted script to accept said internal resource when said security box cannot validate said script control definition at said subdirectory.

8. The method of claim 1, further comprising the step of:
said security sandbox denying said untrusted script to accept said internal resource when said type of request is not allowed in said script control definition at said subdirectory.

9. The method of claim 1, further comprising the step of:
said security sandbox denying said untrusted script to accept said internal resource when said origination of request is not allowed in said script control definition at said subdirectory.

10. The method of claim 1, wherein any type of request is allowed when "any" is specified as the type to be allowed in a declaration file.

11. The method of claim 1, wherein scripts from all origination are allowed when allowed originations are not specified in a declaration file.

12. The method of claim 1, wherein wildcard characters are used to specify originations from which scripts are allowed.

13. The method of claim 1, wherein said script control definitions are cached by said sandbox so that said script control definitions are only loaded once.

14. The method of claim 1, wherein said request URI specifies a SOAP request.

15. The method of claim 1, wherein said declaration files are of XML.

* * * * *